United States Patent
Kim et al.

(10) Patent No.: US 9,840,248 B2
(45) Date of Patent: Dec. 12, 2017

(54) METHOD FOR PREVENTING ENGINE CLUTCH HAZARD OF HYBRID VEHICLE

(71) Applicant: Hyundai Motor Company, Seoul (KR)

(72) Inventors: Yeon Bok Kim, Gyeonggi-do (KR); Young Joon Chang, Gyeonggi-do (KR); Jeong Soo Eo, Gyeonggi-do (KR); Daero Park, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/212,576

(22) Filed: Jul. 18, 2016

(65) Prior Publication Data
US 2017/0166182 A1  Jun. 15, 2017

(30) Foreign Application Priority Data

Dec. 14, 2015 (KR) .................. 10-2015-0178663

(51) Int. Cl.
*B60W 20/00* (2016.01)
*B60W 10/02* (2006.01)
*B60W 10/06* (2006.01)

(52) U.S. Cl.
CPC ............ *B60W 20/00* (2013.01); *B60W 10/02* (2013.01); *B60W 10/06* (2013.01); *B60W 2710/021* (2013.01); *B60Y 2300/42* (2013.01)

(58) Field of Classification Search
None
See application file for complete search history.

(56) References Cited

U.S. PATENT DOCUMENTS

| | | | | |
|---|---|---|---|---|
| 7,867,135 B2 * | 1/2011 | Wu | .................. | B60K 6/365 |
| | | | | 477/5 |
| 9,032,824 B2 * | 5/2015 | Arai | .................. | F16H 61/12 |
| | | | | 74/337.5 |
| 9,037,366 B2 | 5/2015 | Moon et al. | | |
| 2015/0329106 A1 * | 11/2015 | Kuwahara | .............. | B60K 6/48 |
| | | | | 477/5 |

FOREIGN PATENT DOCUMENTS

| | | |
|---|---|---|
| JP | 2000-224712 A | 8/2000 |
| JP | 2001-263368 A | 9/2001 |
| JP | 2005-282600 A | 10/2005 |
| KR | 10-2015-0072570 A | 6/2015 |
| KR | 2015-0078365 A | 7/2015 |

\* cited by examiner

*Primary Examiner* — Dirk Wright
(74) *Attorney, Agent, or Firm* — Mintz Levin Cohn Ferris Glovsky and Popeo, P.C.; Peter F. Corless

(57) ABSTRACT

A method for preventing engine clutch hazard of a hybrid vehicle includes: transmitting, by a safety module of a controller, a signal which instructs an engine clutch to be engaged or released to a safety module of an actuator that drives the engine clutch that connects an engine with a motor or disconnects the engine from the motor; and controlling, by the safety module of the actuator, the engine clutch to perform a normal operation based on the signal.

5 Claims, 4 Drawing Sheets

METHOD FOR PREVENTING ENGINE CLUTCH HAZARD OF HYBRID VEHICLE

CROSS-REFERENCE TO RELATED APPLICATION

This application claims under 35 U.S.C. §119(a) the benefit of Korean Patent Application No. 10-2015-0178663 filed in the Korean Intellectual Property Office on Dec. 14, 2015, the entire contents of which are incorporated herein by reference.

BACKGROUND (a) Field of the Invention

The present invention relates to a hybrid vehicle (or a hybrid electric vehicle), and more particularly, to a method for preventing engine clutch hazard of a hybrid vehicle.

(b) Description of the Related Art

An environmentally-friendly vehicle includes a fuel cell vehicle, an electric vehicle, a plug-in electric vehicle, and a hybrid vehicle, and typically includes a motor to generate driving force.

A hybrid vehicle, which is an example of the environmentally-friendly vehicle, uses an internal combustion engine and power of a battery together. In other words, the hybrid vehicle efficiently combines and uses power of the internal combustion engine and power of a motor.

The hybrid vehicle can include an engine, a motor, an engine clutch to adjust power between the engine and the motor, a transmission, a differential gear apparatus, a battery, a starter-generator that starts the engine or generates electricity by output of the engine, and wheels.

Further, the hybrid vehicle can include a hybrid control unit (HCU) for controlling an entire operation of the hybrid vehicle, an engine control unit (ECU) for controlling an operation of the engine, a motor control unit (MCU) for controlling an operation of the motor, a transmission control unit (TCU) for controlling an operation of the transmission, and a battery control unit (BCU) for controlling and managing the battery.

The battery control unit can be referred to as a battery management system (BMS). The starter-generator can be referred to as an integrated starter and generator (ISG) or a hybrid starter and generator (HSG).

The hybrid vehicle can be driven in a driving mode, such as an electric vehicle (EV) mode, which is an electric vehicle mode using only power of the motor, a hybrid vehicle (HEV) mode, which uses rotational force of the engine as main power and uses rotational force of the motor as auxiliary power, and a regenerative braking (RB) mode for collecting braking and inertial energy during driving by braking or inertia of the vehicle through electricity generation of the motor to charge the battery.

The hybrid vehicle operates the engine clutch in order to transmit power or separate power between the motor and the engine for switching the mode. Operation hydraulic pressure of the engine clutch determining an operation of the engine clutch considerably influences drivability, power performance, and fuel efficiency of the hybrid vehicle, so that the operation hydraulic pressure of the engine clutch needs to be accurately controlled.

The operation hydraulic pressure of the engine clutch may be determined by initial hydraulic pressure by which torque is started to be transmitted as both ends of friction material of the engine clutch are in contact with each other, and feedback hydraulic pressure for adjusting the hydraulic pressure of the engine clutch by receiving feedback of speeds of the engine and the motor. The initial hydraulic pressure point may be called a kiss point.

The kiss point may be changed during the use of the engine clutch. Accordingly, it is necessary to control hydraulic pressure of the engine clutch so that the engine clutch may transmit the torque at an appropriate point by learning the kiss point.

The above information disclosed in this Background section is only for enhancement of understanding of the background of the invention and therefore it may contain information that does not form the prior art that is already known in this country to a person of ordinary skill in the art.

SUMMARY

The present invention provides a method for preventing engine clutch hazard of a hybrid vehicle which is capable of detecting failure of an engine clutch at an early stage and preventing a risk according to a failure situation in the engine clutch.

An exemplary embodiment of the present invention may provide the method for preventing engine clutch hazard of the hybrid vehicle, including: transmitting, by a safety module of a controller, a signal which instructs an engine clutch to be engaged or released to a safety module of an actuator that drives the engine clutch that connects an engine with a motor or disconnects the engine from the motor; and controlling, by the safety module of the actuator, the engine clutch to perform a normal operation based on the signal.

The method for preventing engine clutch hazard of the hybrid vehicle may further include: when the signal does not allow engagement of the engine clutch, controlling, by the safety module of the actuator, the engine clutch not to be engaged by stopping the motor included in the actuator; and when the signal does not allow engagement of the engine clutch, turning-off, by the safety module of the actuator, the engine.

The method for preventing engine clutch hazard of the hybrid vehicle may further include: when the signal does not allow release of the engine clutch, making, by the safety module of the actuator, the engine clutch not be released by stopping the motor included in the actuator.

The method for preventing engine clutch hazard of the hybrid vehicle may further include: when the signal is a command which instructs an engagement of the engine clutch and the safety module of the actuator detects that the engine clutch is not engaged, controlling, by the safety module of the actuator, the engine clutch to be engaged by driving the motor included in the actuator.

The safety module of the actuator may be reset when the engine clutch is not engaged by stopping the motor included in the actuator.

The method for preventing engine clutch hazard of the hybrid vehicle according to the exemplary embodiment of the present invention may detect unintended or abnormal behavior of the engine clutch to reduce or eliminate a risk factor in advance and may reduce injury to a driver of the vehicle and damage to the vehicle through appropriate response to the failure of the engine clutch.

BRIEF DESCRIPTION OF THE DRAWINGS

A brief description of the drawings will be provided to more sufficiently understand the drawings which are used in the detailed description of the present invention.

DETAILED DESCRIPTION OF THE EMBODIMENTS

Figure 1:
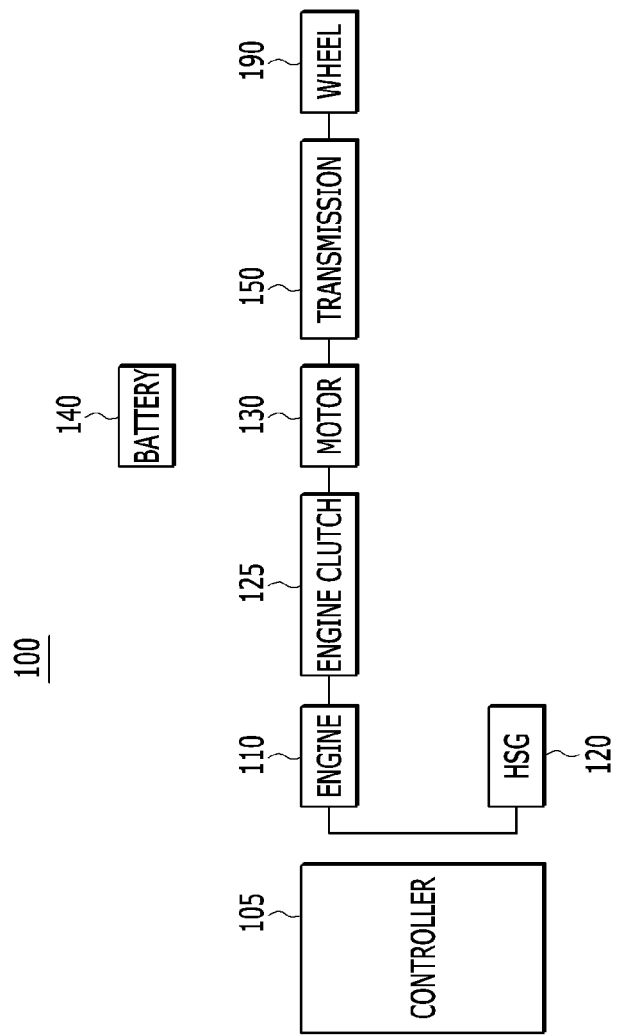
FIG. 1 is a block diagram for explaining a hybrid vehicle including a device for preventing engine clutch hazard according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

In order to sufficiently understand the present invention and the object achieved by embodying the present invention, the accompanying drawings illustrating exemplary embodiments of the present invention and contents described in the accompanying drawings are to be referenced.

An engine clutch is installed between an engine and an electric motor, and is a system that enables a vehicle to travel in an electric vehicle mode and in a hybrid electric vehicle mode by passing or blocking a driving force of the engine according to a request of a driver of the vehicle and a state of the vehicle.

A hybrid control unit (HCU) receives information of the engine, the motor, and a transmission included in a hybrid vehicle system and accelerator pedal information regarding the driver through an interface module to determine a control state of the engine clutch. When an engagement of the engine clutch is required, the HCU calculates a transfer torque that is required for the engagement to determine whether the engine clutch is engaged or released. After that, the HCU issues an operation command for the engine clutch. The operation command is delivered to a local control unit (LCU) within a hydrostatic clutch actuator (HCA) that is the engine clutch actuator so that the LCU operates an electric motor included in the HCA based on the command, thereby ultimately engaging or releasing the engine clutch.

Engagement control for the engine clutch engages (or closes) the engine clutch when certain condition(s) are met, and release control for the engine clutch releases (or opens) the engine clutch when certain condition(s) are met.

In the related art, it is known to measure a failure of the engine clutch by using various sensors or detects the failure of the engine clutch by using a software model (e.g., a temperature model). However, although values of the sensors and a value of the model may be normal, it is not possible to detect an abnormal behavior of the engine clutch.

In addition, when a wrong operation command for the engine clutch is transferred due to a logic error or a communication error, an unintended behavior of the engine clutch can occur. For example, if a failure caused by damage to the engine clutch hardware occurs, a logic operation and the values of the sensors are normal but the engine clutch may perform an abnormal operation. In order to check the abnormal operation, an additional sensor is required. In addition, an appropriate action cannot be performed in a timely manner when the failure occurs, thereby potentially causing damage to the vehicle.

FIG. 1 is a block diagram for explaining a hybrid vehicle including a device for preventing engine clutch hazard according to an exemplary embodiment of the present invention. The device for preventing engine clutch hazard of the hybrid vehicle may also be referred to as a device for controlling engine clutch fail-safe of the hybrid vehicle.

Referring to FIG. 1, the hybrid vehicle 100 includes a controller 105, an engine 110, a hybrid starter-generator (HSG) 120, an engine clutch 125, a motor (or a driving motor) 130 which may be an electric motor, a battery 140, a transmission 150, and wheels (or driving wheels) 190.

The device for preventing engine clutch hazard of the hybrid vehicle may include the controller 105 and the engine clutch 125.

The hybrid vehicle 100, which is a hybrid electric vehicle, may use the engine 110 and the motor 130 as power sources, and includes the engine clutch 125 arranged between the engine 110 and the motor 130 so that the hybrid vehicle 100 may be operated in the electric vehicle (EV) mode in which the hybrid vehicle 100 travels by the motor 130 in a state where the engine clutch 125 is opened, and in a hybrid electric vehicle (HEV) mode in which the hybrid vehicle 100 is capable of travelling by both the motor 130 and the engine 110 in a state where the engine clutch 125 is closed.

The hybrid vehicle 100 may include a power train of a transmission mounted electric device (TMED) type in which the motor 130 is connected to the transmission 150. The hybrid vehicle 100 may provide a driving mode, such as the EV mode, which is the electric vehicle mode using only power of the motor, and the HEV mode, which uses rotational force of the engine as main power and uses rotational force of the motor as auxiliary power depending on whether the engine clutch 125 that is disposed between the engine 110 and the motor 130 is engaged (or connected). In more detail, in the hybrid vehicle 100 including a structure in which the motor 130 may be directly connected to the transmission 150, revolutions per minute (RPM) of the engine may be increased by drive of the HSG 120, power delivery and power cutoff between the engine and the motor may be performed via engagement and release of the clutch 125, a driving force may be transmitted (or transferred) to the wheels 190 through a power transmission system which may include the transmission 150, and torque of the engine may be transmitted to the motor via engagement of the clutch 125 when transmission of the engine torque is requested.

The controller 105 may include a hybrid control unit (HCU), a motor control unit (MCU), an engine control unit (ECU), and a transmission control unit (TCU).

The HCU may control starting of the engine by controlling the HSG 120 when the engine 110 stops. The HCU may be the highest controller, and may synthetically control controllers (for example, the MCU) connected to a network such as a controller area network (CAN) which is a vehicle network, and may control overall operation of the hybrid vehicle 100.

The MCU may control the HSG 120 and the motor 130. The MCU may control an output torque of the driving motor 130 through the network depending on the control signal output from the HCU, and thus may control the motor to operate at maximum efficiency. The MCU may include an inverter configured as a plurality of power switching elements. A power switching element included in the inverter may include an insulated gate bipolar transistor (IGBT), a field effect transistor (FET), a metal oxide semiconductor FET (MOSFET), a transistor, or a relay. The inverter converts a direct current (DC) voltage that is supplied from the battery 140 into a three-phase alternating current (AC) voltage to drive the driving motor 130. The MCU may be disposed between the battery 140 and the motor 130.

The ECU may control a torque of the engine 110. The ECU may control an operating point (or a driving point) of the engine 110 through the network depending on a control signal output from the HCU, and may control the engine to output an optimal torque. The TCU may control an operation of the transmission 150.

For example, the controller 105 may be one or more microprocessors operated by a program or hardware including the microprocessor. The program may include a series of commands for executing a method for preventing engine clutch hazard of the hybrid vehicle according to an exemplary embodiment of the present invention, which will be described below.

The engine 110 may include a diesel engine, a gasoline engine, a liquefied natural gas (LNG) engine, or a liquefied petroleum gas (LPG) engine, and may output a torque at the operating point depending on a control signal output from the ECU. The torque may be combined with driving force of the driving motor 130 in the HEV mode.

The HSG 120 may operate as a motor depending on a control signal output from the MCU to start the engine 110, and may operate as a generator in a state in which start of the engine 110 is maintained to provide generated electric power to the battery 140 via the inverter. The HSG 120 may be connected to the engine 110 through a belt.

The engine clutch 125 may be disposed (or mounted) between the engine 110 and the driving motor 130, and may be operated to switch power delivery between the engine 110 and the motor 130. The engine clutch 125 may connect or intercept power between the engine and the motor depending on switching of the HEV mode and the EV mode. The engine clutch 125, which is a device for transmitting the engine torque to the wheel, may include a wet type engine clutch or a dry type clutch engine clutch. Operation of the engine clutch 125 may be controlled by the controller 105.

The engine clutch 125 may be engaged by pressure of a fluid (e.g., oil) that is supplied to the engine clutch 125. The pressure of fluid for engaging the engine clutch 125 may be pressure above the kiss point that is start engagement pressure of the engine clutch, and may be controlled by the controller 105. The kiss point refers to an initial hydraulic pressure by which torque is started to be transmitted as two friction members included in the engine clutch 125 are in contact with each other. A slip state of the engine clutch 125 may be started at the kiss point. The kiss point may be a starting point of torque delivery, and may be the pressure of the fluid that converts a state of the engine clutch into a slip state in which the clutch starts friction.

The motor 130 may be operated by a three-phase AC voltage that is output from the MCU to generate a torque. The motor 130 may be operated as a generator during coasting drive or regenerative braking to supply a voltage (or regenerative energy) to the battery 140.

The battery 140 may include a plurality of unit cells. A high voltage for providing a driving voltage (for example, approximately 350-450 V DC) to the motor 130 that provides driving power to the wheels 190 may be stored in the battery 140.

The transmission 150 may include a multiple speed transmission, such as an automatic transmission or a dual clutch transmission (DCT), or a continuously variable transmission (CVT), and may shift to a desired gear by using hydraulic pressure depending on control of the TCU to operate engagement elements and disengagement elements. The transmission 150 may transmit driving force of the engine 110 and/or the motor 130 to the wheels 190, and may intercept power delivery between the motor 130 (or the engine 110) and the wheels 190. The transmission 150 may include a gearbox.

Figure 2:
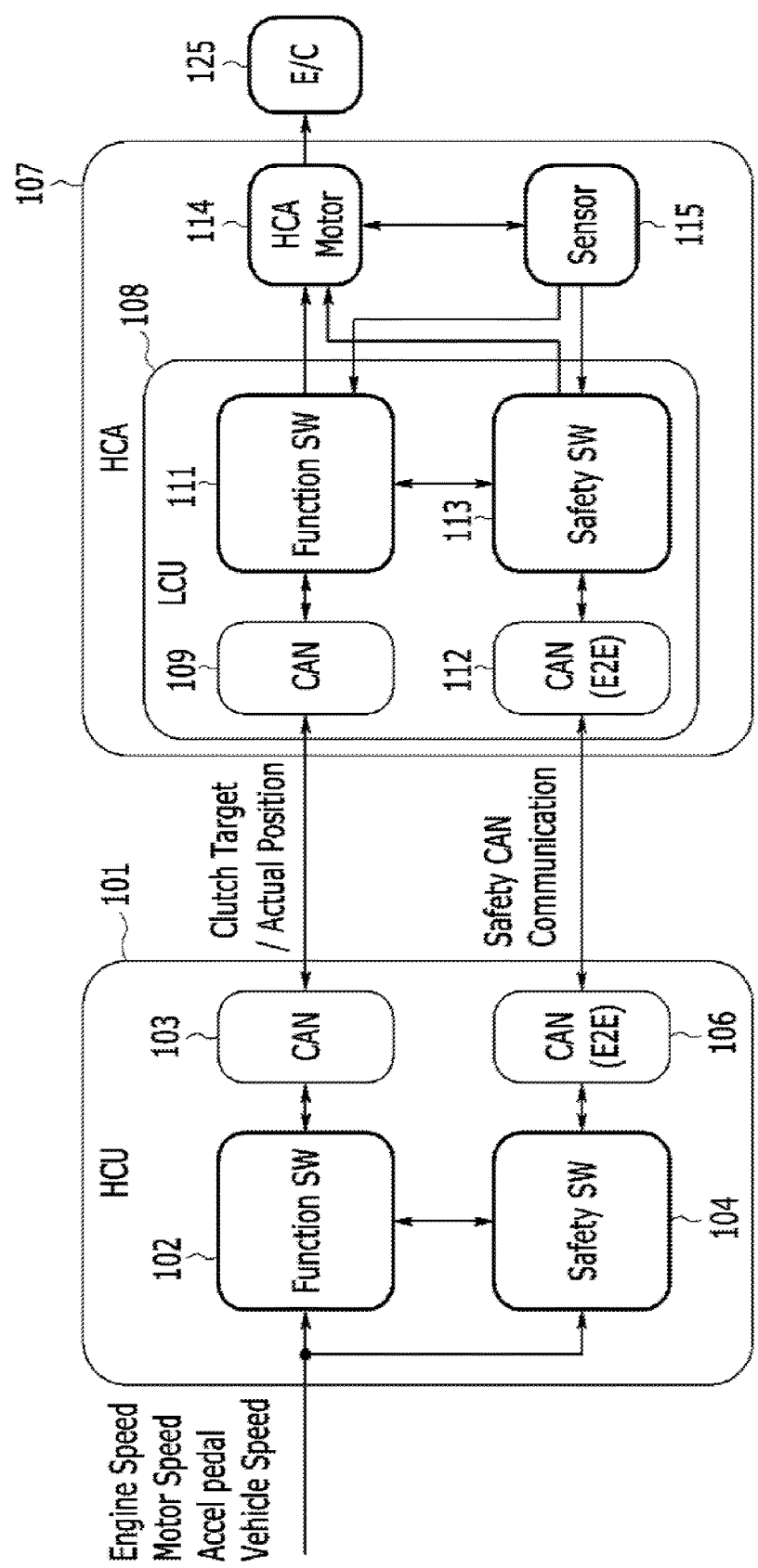
FIG. 2 is a block diagram for explaining a controller shown in FIG. 1.

FIG. 2 is a block diagram for explaining the controller shown in FIG. 1.

Referring to FIG. 2, the device for preventing engine clutch hazard of the hybrid vehicle may transmit and receive an engagement operation command or a release operation command for the engine clutch 125 by using software (SW) logic that is disposed between the HCU 101 and a local control unit (LCU) 108 that is included in a hydrostatic clutch actuator (HCA) 107, and may transmit and receive a behavior command state for the engine clutch by using separate modules 104 and 113 so that the device for preventing engine clutch hazard may detect a malfunction in the engine clutch at an early stage and may immediately perform an appropriate measure to avoid a risk according to a failure situation in the engine clutch. The engine speed, the motor speed, an accelerator pedal signal, and the vehicle speed may be input to the HCU 101.

A clutch position command for engagement or release of the engine clutch may be transmitted by using a function software module 102, but a command (or a command intention) for the engagement or the release of the engine clutch may be transmitted by using a safety software module (or a safety module) 104. The safety module may use controller area network identification (CAN ID) for end to end (E2E) protection (e.g., cyclic redundancy checking (CRC)) to increase reliability of a signal, and may have a priority compared to the function software module 102.

Function software modules 102 and 111 may control the engagement or the release of the engine clutch, but safety modules 104 and 113 may detect abnormal behavior of the engine clutch if the abnormal behavior of the engine clutch performs the abnormal behavior because of a logic error or a controller area network (CAN) communication error. In other words, if the safety module of the HCU sent a signal that releases the engine clutch to make the vehicle travel in the EV mode but the engine clutch is unintentionally engaged because of failure of the engine clutch, the safety module of the HCA may detect the engagement to stop operation of a motor 114 included in the HCA, thereby preventing the engagement of the engine clutch to eliminate a risk according to the engagement. Also, the embodiment of the present invention may eliminate a risk according to release of the engine clutch even if the engine clutch is unintentionally released because of the failure of the engine clutch.

The on-state or an off-state of an accelerator pedal (or the accelerator pedal signal) that is shown in FIG. 2 may be detected by an acceleration pedal position sensor (APS) included in the vehicle 100. The APS may continuously measure a position value of the accelerator pedal. The position value of the accelerator pedal may be 100% when the accelerator pedal is fully depressed and the position value of the accelerator pedal may be 0% when the accelerator pedal is not depressed.

Referring back to FIG. 2, the device for preventing engine clutch hazard preferably includes the HCU 101, the HCA 107, and the engine clutch 125.

The HCU 101 includes the function software module 102, a controller area network (CAN) 103, the safety module 104, and a controller area network (CAN) 106. The HCA 107 includes the function software module 111, the LCU 108 that includes a controller area network (CAN) 109, the safety module 113, and a controller area network (CAN) 112, the motor 114, and a sensor 115 that senses operations of the motor 114 and the engine clutch.

Figure 3:
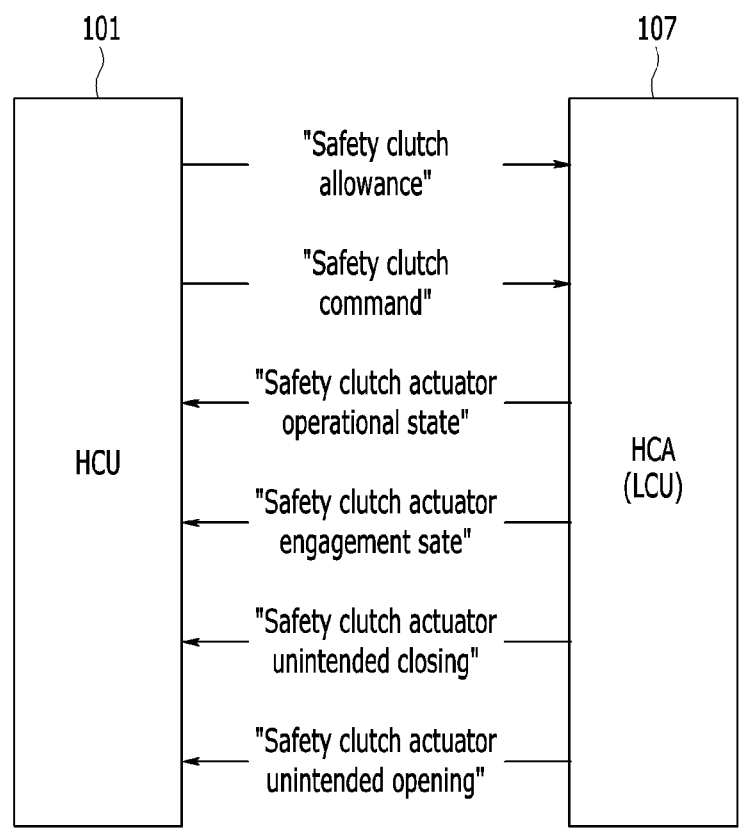
FIG. 3 is a block diagram for explaining a signal relationship between the controller and the engine clutch actuator shown in FIG. 2.

Referring to FIGS. 1-3, the safety module 104 of the HCU 101 included in the controller 105 may transmit a signal via the CAN 106 and the CAN 112 to the safety module 113 of the actuator 107 that drives the engine clutch 125 that connects the engine 110 with the motor 130 or disconnects the engine from the motor. The signal may instruct the engine clutch 125 to be engaged or released.

The safety module 113 of the actuator may control the engine clutch to perform a normal operation based on the signal.

When the signal (Safety Clutch Close Allowance) does not allow engagement of the engine clutch 125, the safety module 113 of the actuator may make the engine clutch not be engaged by stopping the motor 114 such as an electric motor and may turn off (or stop) the engine 110. The safety module 113 of the actuator or the safety module 104 may reset the LCU 108 when the engine clutch is not engaged by stopping the motor included in the actuator.

When the signal (Safety Clutch Open Allowance) does not allow release of the engine clutch 125, the safety module 113 of the actuator may control the engine clutch not to be released by stopping the motor 114 included in the actuator.

When the signal is a command (Safety Clutch Close Command) which instructs an engagement (e.g., a complete closing) of the engine clutch and the safety module 113 of the actuator detects that the engine clutch is not engaged (or completely engaged), the safety module 113 may control the engine clutch to be engaged (or completely engaged) by driving the motor 114 included in the actuator.

FIG. 3 is a block diagram for explaining a signal relationship between the controller and the engine clutch actuator shown in FIG. 2.

Referring to FIGS. 2-3, a failure of the engine clutch described below may be defined by using a hazard analysis & risk assessment (HARA), and a method for detecting the failure and a method of preventing the engine clutch hazard may be determined.

When the detected failure is an abnormal engagement of the engine clutch, a possible risk may be an abnormal acceleration of the vehicle, the method for detecting the failure may be a method in which the HCA 107 detects that the engine clutch 125 is moved to a position (Threshold 1) in a closing direction when the HCU 101 sends the signal (Safety Clutch Close Allowance) as a signal (Not being allowed) to the HCA (or the LCU), and the method of preventing the engine clutch hazard is a method in which a state (Safe_State1) is entered and the engine is turned off. The state (Safe_State1) may be a state in which the engine clutch is stopped by stopping the motor 114. When a state of the device for preventing engine clutch hazard (or a state of the safety module 113) is the state (Safe_State1 state), the LCU 108 may be reset for healing (or repair) of the engine clutch. The state (Safe_State1) may be entered even when the safety module 113 cannot enter a state (Safe_State2). The position (Threshold 1) may be a position in which the engine clutch is moved as much as $\alpha$ mm or more in the closing direction from a current position of the engine clutch.

When the detected failure is an abnormal release of the engine clutch, a possible risk may be an abnormal deceleration of the vehicle, the method for detecting the failure may be a method in which the HCA 107 detects that the engine clutch 125 is moved to a position (Threshold 2) in an opening direction when the HCU 101 sends the signal (Safety Clutch Open Allowance) as a signal (Not being allowed) to the HCA (or the LCU), and the method of preventing the engine clutch hazard is a method in which the state (Safe_State1) is entered. The position (Threshold 2) may be a position in which the engine clutch is moved as much as $\beta$ mm or more in the opening direction from a current position of the engine clutch.

When the detected failure is a failure in which it is detected that the engine clutch is not engaged, a possible risk may be an abnormal deceleration of the vehicle and impossibility of driving the vehicle that occurs when the battery 140 has a low state of charge (SOC), the method for detecting the failure may be a method in which the HCU 101 sends the command (Safety Clutch Close Command) to the HCA (or the LCU) but the HCA 107 detects that the engine clutch 125 is not moved to a complete closing position (Threshold 3), and the method of preventing the engine clutch hazard is a method in which a state (Safe_State2) is entered. The state (Safe_State2) may be a state in which the engine clutch is moved to the complete closing position. The position (Threshold 3) may be a position in which the engine clutch is moved to the complete closing position ($\gamma$ mm) that may, for example, be −4.53 mm. An open state of the clutch 125 may mean a state in which both ends of the engine clutch do not interfere with each other and the engine clutch is physically separated. A slip state of the clutch may mean a state in which the clutch starts friction and a speed difference between the both ends is above a predetermined value. A lock-up state (or a complete closing state) of the clutch may mean a state in which there is no speed difference between the both ends and 100% torque applied to the input of the clutch is transferred to output of the clutch.

When the detected failure is a failure in which it is detected that the engine clutch is not released, a possible risk may not exist.

Figure 4:
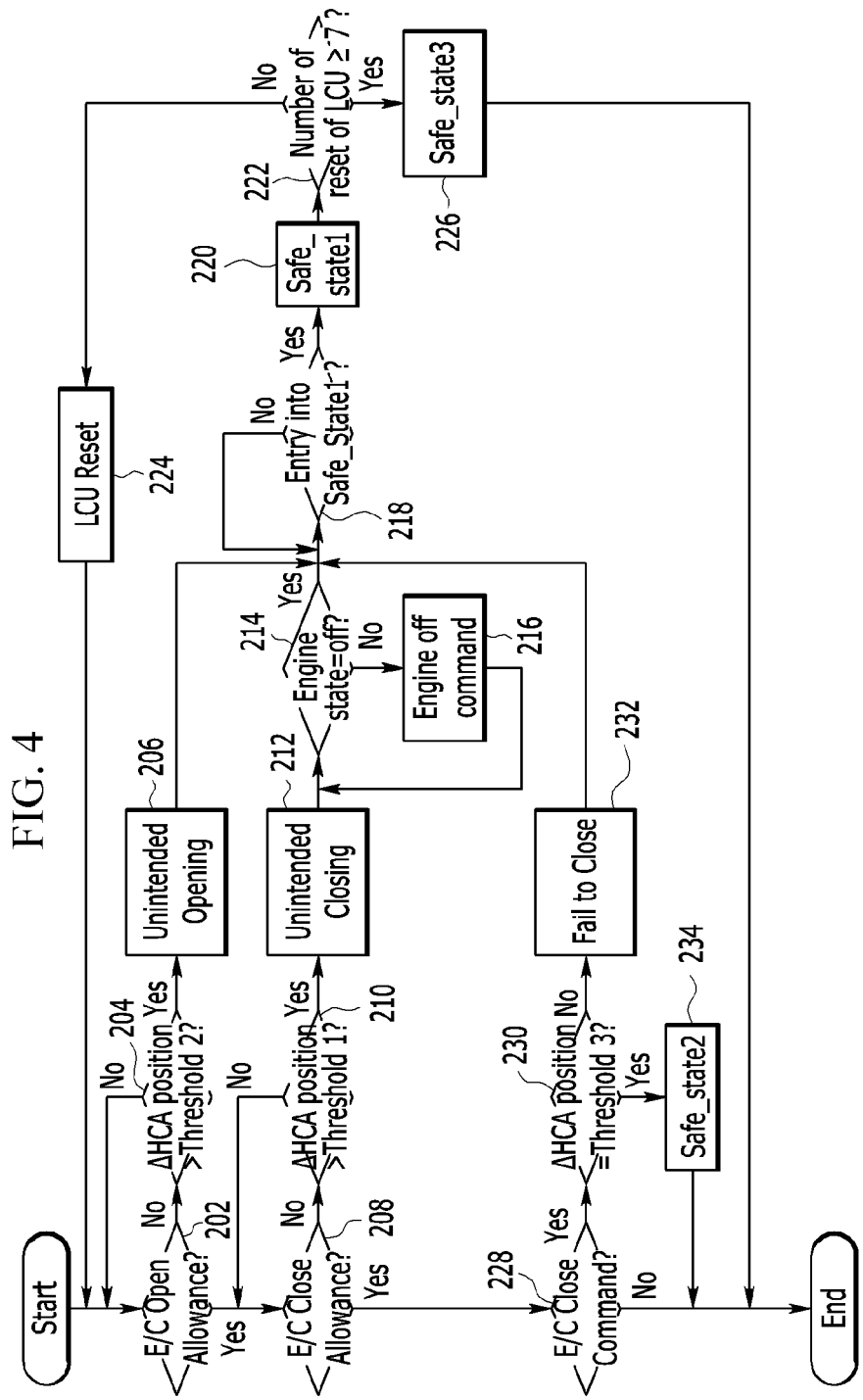
FIG. 4 is a flowchart describing a method for preventing engine clutch hazard of the hybrid vehicle according to an exemplary embodiment of the present invention.

FIG. 4 is a flowchart describing a method for preventing engine clutch hazard of the hybrid vehicle according to an exemplary embodiment of the present invention.

Referring to FIGS. 2 and 4, in an opening allowance determining step 202, when the safety module 104 transmits a signal which instructs the engine clutch 125 to be engaged or released to the safety module 113 that drives the engine clutch that connects the engine with the motor or disconnects the engine from the motor, the safety module 113 may determine whether release of the engine clutch is allowed based on the signal.

According to a comparison step 204, when the release of the engine clutch is not allowed, the safety module 113 may determine whether a position (ΔHCA) to which a friction member of the engine clutch 125 is moved by the motor 114 is greater than the position (Threshold 2).

According to a determination step 206, when the position (ΔHCA) is greater than the position (Threshold 2), the safety module 113 may determine that movement of the friction member of the engine clutch is an abnormal release (or an unintended opening).

According to an entry step 218 and 220, when it is determined that the signal does not allow the release of the engine clutch 125, the safety module 113 may enter the state (Safe_State1).

According to a reset counting step 222, when the state (Safe_State1) is entered, the safety module 113 may determine whether number of times of reset of the LCU 108 is more than a threshold value (e.g., 7 times).

According to a reset step 224, when the number of times of reset of the LCU 108 does not exceed 7 times, the LCU may be reset by the safety module 113.

According to a state entering step 226, when the number of times of reset of the LCU 108 exceeds 7 times, the safety module 113 may enter a state (Safe_State3). The state (Safe_State3) may be a state in which the engine clutch is stopped by stopping the motor 114, a controller area network (CAN) signal of the vehicle is determined as invalid, and control of the engine clutch is impossible. The state (Safe_State3) may be entered when the failure is not repaired by the state (Safe_State1).

According to an closing allowance determining step 208, when the safety module 104 transmits the signal which instructs the engine clutch 125 to be engaged or released to the safety module 113 and the release of the engine clutch is allowed, the safety module 113 may determine whether engagement of the engine clutch is allowed based on the signal.

According to s comparison step 210, when engagement of the engine clutch is not allowed, the safety module 113 may determine whether the position (ΔHCA) is greater than the position (Threshold 1).

According to a determination step 212, when the position (ΔHCA) is greater than the position (Threshold 1), the safety module 113 may determine that movement of the friction member of the engine clutch is an abnormal engagement (or an unintended closing).

According to a turning-off step 214 and 216, the safety module 113 may turn off the engine 110. After the turning-off step 214 and 216, a process that is the method for preventing engine clutch hazard of the hybrid vehicle proceeds to the entry step 218 and 220.

According to an engagement command determining step 228, when the safety module 104 transmits the signal which instructs the engine clutch 125 to be engaged or released to the safety module 113 and the engagement of the engine clutch is allowed, the safety module 113 may determine whether the signal is a command which instructs an engagement of the engine clutch based on the signal.

According to a check step 230, when the signal is the command which instructs the engagement of the engine clutch, the safety module 113 may determine whether the position (ΔHCA) is the position (Threshold 3).

According to a failure determining step 232, when the position (ΔHCA) is not the position (Threshold 3), the safety module 113 may determine that the engagement of the engine clutch fails. After the failure determining step 232, the process that is the method for preventing engine clutch hazard of the hybrid vehicle proceeds to the entry step 218 and 220.

According to a state entering step 234, when the position (ΔHCA) is the position (Threshold 3), the safety module 113 may enter the state (Safe_State2).

The components, "~ unit", block, or module which are used in the present exemplary embodiment may be implemented in software such as a task, a class, a subroutine, a process, an object, an execution thread, or a program which is performed in a predetermined region in the memory, or hardware such as a field programmable gate array (FPGA) or an application-specific integrated circuit (ASIC), and may be performed with a combination of the software and the hardware. The components, '~ part', or the like may be embedded in a computer-readable storage medium, and some part thereof may be dispersedly distributed in a plurality of computers.

As set forth above, exemplary embodiments have been disclosed in the accompanying drawings and the specification. Herein, specific terms have been used, but are just used for the purpose of describing the present invention and are not used for qualifying the meaning or limiting the scope of the present invention, which is disclosed in the appended claims. Therefore, it will be understood by those skilled in the art that various modifications and equivalent exemplary embodiments are possible from the present invention. Accordingly, the actual technical protection scope of the present invention must be determined by the spirit of the appended claims.

What is claimed is:

1. A method for preventing engine clutch hazard of a hybrid vehicle, comprising the steps of:
    transmitting, by a safety module of a controller, a signal which instructs an engine clutch to be engaged or released to a safety module of an actuator that drives the engine clutch that connects an engine with a motor or disconnects the engine from the motor; and
    controlling, by the safety module of the actuator, the engine clutch to perform a normal operation based on the signal.

2. The method of claim 1, further comprising the steps of:
    when the signal does not allow engagement of the engine clutch, making, by the safety module of the actuator, the engine clutch not be engaged by stopping the motor included in the actuator; and when the signal does not allow engagement of the engine clutch, turning-off, by the safety module of the actuator, the engine.

3. The method of claim 1, further comprising the step of:
when the signal does not allow release of the engine clutch, making, by the safety module of the actuator, the engine clutch not be released by stopping the motor included in the actuator.

4. The method of claim 1, further comprising the step of:
when the signal is a command which instructs an engagement of the engine clutch and the safety module of the actuator detects that the engine clutch is not engaged, controlling, by the safety module of the actuator, the engine clutch to be engaged by driving the motor included in the actuator.

5. The method of claim 2, wherein the safety module of the actuator is reset when the engine clutch is not engaged by stopping the motor included in the actuator.

\* \* \* \* \*